Jan. 21, 1958    W. GADOMSKI    2,820,300
CHECK GAUGE FOR TAPERED OBJECTS

Filed March 4, 1954    2 Sheets-Sheet 1

INVENTOR
WALTER GADOMSKI
BY *Chapin & Neal*
ATTORNEYS

Jan. 21, 1958 W. GADOMSKI 2,820,300
CHECK GAUGE FOR TAPERED OBJECTS
Filed March 4, 1954 2 Sheets-Sheet 2

INVENTOR
WALTER GADOMSKI
BY Chapin & Neal
ATTORNEYS

United States Patent Office 2,820,300
Patented Jan. 21, 1958

2,820,300

CHECK GAUGE FOR TAPERED OBJECTS

Walter Gadomski, Thompsonville, Conn.

Application March 4, 1954, Serial No. 414,168

4 Claims. (Cl. 33—174)

This invention relates to instruments for checking the accuracy of tapered objects, such as machine parts and the like having cylindrically tapered bodies and has for an object to indicate with micrometric accuracy any variation in the measurement of a workpiece from a predetermined dimension with respect to a given diametrical datum line or point on the taper.

One of the objects of the invention is to provide a simplified gauge device which is sturdy, relatively inexpensive in construction and adapted to check tapered objects speedily and with precision.

Another object of the invention is to provide a gauging device which may be set up to check the diametrical measurement of a tapered object at a given datum point or reference line thereon or in the alternative the length of a tapered object from a point at which the object is of a predetermined diametrical measurement.

The invention may be utilized to facilitate either the inspection of finished tapered workpieces or to assist in the production of the same.

Figure 1:
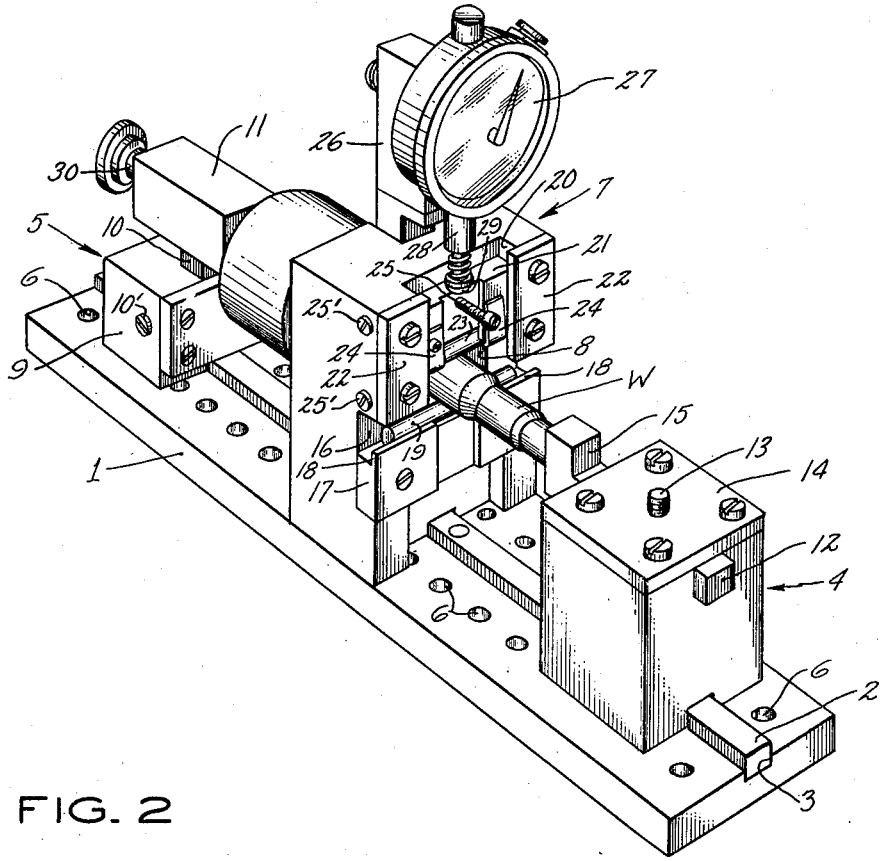
Figure 2:
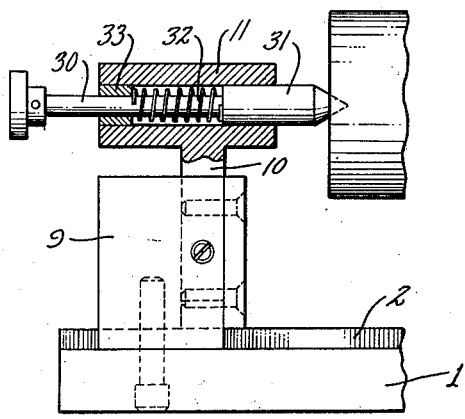
Figure 3:
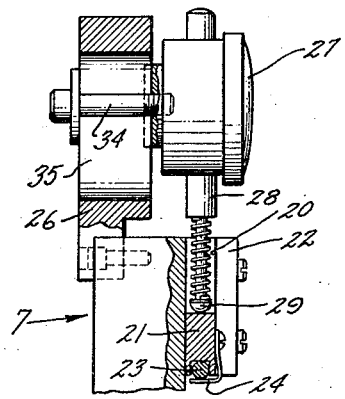
Figure 4:
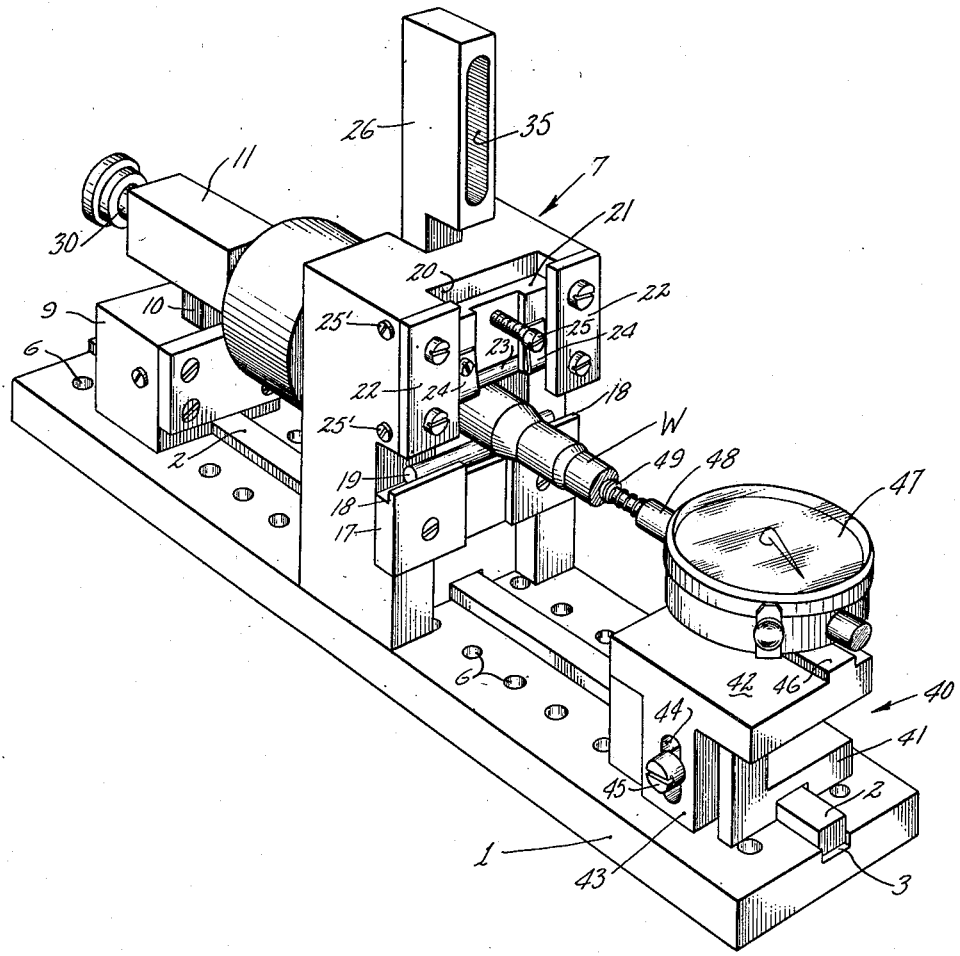

The above and other objects and advantages of the invention will be appreciated from the following description thereof as exemplified in the accompanying drawings, in which Fig. 1 is a perspective view of a gauge device illustrating the manner in which a tapered workpiece is supported for checking the accuracy of the diameter thereof at a given reference point on the taper;

Figs. 2 and 3 are fragmentary sectional views showing details of construction; and Fig. 4 is a perspective view similar to Fig. 1 showing an alternative mounting of an indicator gauge of the device for checking the length of the tapered object from a point on the taper at which the diameter of the work is of a given dimension.

The device of this invention comprises an instrument in which a tapered workpiece may be mounted and yieldably urged to position the tapered portion between spaced abutments at diametrically opposite sides thereof and with the end of the workpiece against an abutment located to receive the reduced end of the work. According to the invention two of said abutments may be fixed in predetermined spaced relation to each other, the remaining abutment being movable to engage the workpiece and check with an indicating device the accuracy of the piece with relation to the predetermined dimension of the spacing between the fixed abutments.

In the drawings, the device is provided with a base member 1 in which is mounted a key 2 extending centrally of the base along the length thereof and being fitted therein by a keyway 3. At each end of the base are two end supports, generally indicated by numerals 4 and 5, both of which ride on the key 2 straddling the same by means of inverted keyway slots cut in the undersurface of the supports. Supports 4 and 5 are suitably secured to the base by means of bolts (not shown) extending upwardly through selected openings of a series of longitudinally spaced openings 6 in the base at either side of the key 2. The spacing between the supports may thus be varied for suitably accommodating objects of various lengths.

Between the end supports and similarly fixed to the base is an intermediate support or pillar block indicated generally by numeral 7. A tapered object as at w is adapted to be positioned between the end supports on an axis parallel to the plane of the base and extends through an opening indicated at 8 of the central pillar to be supported therein as will be described.

Support 5 comprises a block 9 in which a vertically adjustable depending post 10 of a tail stock centering device 11 is fixed as by a set screw 10'. The device 11 yieldably urges the workpiece in the assembly toward support 4. Support 4 carries the abutment for contact with the reduced end of the workpiece and comprises a block in which a slidable member 12 is mounted at the top thereof for extension parallel to the base in the direction of the workpiece w, member 12 being releasably held in fixed position as by a set screw 13 carried by a cap 14 bolted to the block. At the front end of the slide 12 is a right angled portion 15 serving as the abutment for the contact with the end of a workpiece.

The center pillar 7 is provided on the vertical side wall facing the abutment 15 of support 4 with a transversely recessed portion 16 below its opening 8 and in the recess is set a shelf member 17 having a flanged upper edge at 18 for seating a cylindrical pin or roller 19 on the upper edge of the shelf and across the lower edge of the opening 8. The pin 19 defines the lower edge of the opening for supporting the tapered object and seating the same in the assembly.

Above the recess 16 the pillar 7 is provided with a vertically disposed recessed portion at 20 adjacent the upper side of the opening 8. In this recess is mounted a slide carriage as the member 21. Overlapping the lateral edges of the recess are two strap plates 22 providing slots for vertical sliding movement of member 21 in the recess. On the bottom edge of member 21 is carried a cylindrical pin or roller 23 held as by mounting clips 24 at each end of the pin. A handle 25 is threaded into member 21 for manually lifting the slide when inserting a workpiece between the pins 19 and 23, or for adjusting the slide to a predetermined setting and clamping it in the recess 20 by means of set screws 25' threaded into the block 7 against the edge of the slide. The slide is clamped for an alternate arrangement of the device as will be later described.

At the top of and on the opposite side of the pillar 7 is mounted a vertical post 26 having an inwardly offset portion against which is fastened a conventional comparator gauge device 27 having a depending stem 28 with spring loaded tip 29 in contact with the upper edge of member 21. The tip 29 is responsive to the movement of member 12 to indicate a plus or minus variation from a predetermined spacing of the cylindrical pins 19 and 23 as will be described.

In the assembly, as described above, the rollers 19 and 23 are in spaced parallel relation in a plane at right angles to the plane of the base. With roller 23 mounted for vertical slidable movement to vary the spacing between said rollers, the diametrical measurement of the taper at a given point thereon from the end of the workpiece w may be accurately checked. The workpiece may be mounted in the assembly as shown on a longitudinal axis parallel to the plane of the key 2 or base 1 and abuts at its outer tapered end the face of the abutment 15.

In setting the gauge for this type of checking operation and to check a plurality of workpieces such as the workpiece w, wherein the dimensional requirements are stated according to conventional practice to require a certain diameter at a given reference or datum point from the end of the piece $w$, the slide member 12 is first secured in the support block 4 with the front face of the abutment 15 positioned at the correct spacing with relation to the vertical plane defined by the axes of the cylindrical pins 19 and 23. This spacing may be set by conventional gauge blocks or other gauging instruments placed between the abutment 15 and the pins, and member 12 is then anchored on support 4 by the set screw 13. The tail stock centering device 11 at the opposite end is also vertically fixed to bring the axis thereof to a correct elevation for holding the axis of a workpiece $w$, which is resting on pin 19, parallel to the key and base. Here again conventional gauge blocks or other suitable measuring devices may be used for obtaining a proper setting of the elevation of the tail stock center.

The comparator gauge 27 is also set to register a zero reading when the slide 21 is positioned to hold the required spacing of the pin 23 with respect to the pin 19. Conventional gauge blocks or a pattern workpiece may be placed between the pins for correctly setting the comparator gauge.

When thus properly set up the workpieces to be inspected and checked are inserted into the position shown with the tail stock pressing the same against the back stop of the end abutment 15. The gauge 27 will then indicate on the dial reading whether the diameter of the taper at the given reference point thereon is correct, and, if not correct, will accurately show a plus or minus variation from the proper dimensions.

In Fig. 4 the gauge instrument is illustrated with an alternative arrangement in which the comparator gauge is located to form the abutment for the end of a workpiece $w$. In this arrangement the slide 21 is fixed in position by the set screws 25' clamping the slide in the recess 20 to provide the predetermined correct spacing between the pins 19 and 23. Thus a workpiece urged by the tail stock center will be positioned between the pins with the tapered portion at that point of a predetermined known diameter. Any variation in the correct length of the piece from the taper to the end thereof will be indicated by the comparator gauge reading. Thus the workpieces may be checked with reference to the length thereof from a point on the taper at which the required diametrical measurement is located. The comparator gauge in this form serves as the movable abutment member at the end of the workpiece.

As shown by Fig. 4 an end support 40 comprises an L shaped block 41 riding on the key 2 and bolted to the base 1 with a vertically adjustable table member 42 slidably mounted thereon as by a leg portion 43. Portion 43 is vertically slotted as at 44 for clamping engagement by a clamp screw bolt 45. The upper surface of the table is provided with a track 46 in vertical alignment with and parallel to the key 2 to receive the comparator gauge 47 with its stem 48 and spring loaded tip 49. Thus the gauge is vertically and longitudinally adjustable to pre-set the same for a zero reading at the correct spacing thereof from the fixed position of the abutments formed by the spaced pins or rollers 19 and 23.

By the fragmentary view of Fig. 2 the spring loading of the tail stock center is shown. The housing 11 is chambered longitudinally to carry the plunger 30 with shouldered tip 31. Around the plunger 30 is wound spring 32 abutting the shoulder of the tip and urging the same forwardly by reason of its seat against a bushing 33 in the rearward end of the chamber.

In Fig. 3 the mounting of the comparator gauge 27 in the device of Fig. 1 is shown as by the clamp screw bolt 34 extending from the back of the gauge through a vertical slot 35 in the post 26. The gauge 47 of Fig. 4 is similarly mounted by a screw bolt extending upwardly through a horizontally elongated slot (not shown) cut centrally of the track 46 for the longitudinal adjustable mounting thereof.

It will be readily understood that the arrangement of the form of Fig. 1 is primarily to check the diameter of a taper at a given reference point located thereon, and that it may be used for checking multiple diameters on a workpiece or a plurality of workpieces. If desired the work can be checked at one location and by moving the back stop abutment 15 toward or away from the spaced pins 19 and 23 at intervals of one inch or one-half inch a check on the amount of taper per inch or per half inch may be obtained. An accurate check on tapers of a small magnitude are thus obtainable without elaborate instruments.

The arrangement of Fig. 4 is conveniently useful primarily where the specification of the work requires but one taper of a given length to the end of the piece although the same arrangement can be utilized to provide for checking workpieces with multiple diameters.

What is claimed is:

1. A gauge device to check the dimensional accuracy of a tapered cylindrical object with reference to a datum line diameter which comprises a base, end supports and an intermediate support mounted directly on said base, each support having means independently anchoring the same to the base in fixed relation thereto, said intermediate support having an opening for admitting a tapered cylindrical workpiece disposed between the end supports and for resting said cylinder in supported relationship at the location of said intermediate support, and spaced parallel abutment members at opposite sides of said opening lying in a plane at right angles to the base to engage a tapered portion of a workpiece extending through said opening, at least one of said abutment members being adjustable to position the abutments in predetermined spaced relation, one end support having centering means with mechanism to adjust the spacing thereof from said base and having means for carrying the cylindrical workpiece in end supporting relationship with the axis thereof mounted between said spaced abutment members in a plane parallel to said base, said centering means normally urging said cylinder towards the other end support, said other end support having a third abutment member adjustable to position the same in predetermined spaced relation to the plane of said abutment members of the intermediate support and for engaging the other end of said cylinder with a simple bearing contact, one of said adjustable abutment members being freely movable and having a comparator gauge device associated therewith responsive to the movement of said member for indicating any variation from the said predetermined spaced relation thereof.

2. A gauge device for checking the dimensional accuracy of a tapered object with respect to a diametrical datum point on the taper which comprises a base having end supports and an intermediate support, each support being independently mounted directly on said base and having means for anchoring the same in fixed position on said base, said intermediate support having an opening therethrough for supporting a tapered object and spaced parallel abutment members lying in a plane at right angles to said base and adapted to define opposite edges of said opening and receive a tapered object therebetween, one of said abutment members being adjustable to position the same in said plane in predetermined spaced relation to the other member, one of said end supports having an abutment member for a light bearing contact against the reduced end of a tapered object, and adjustable to position said member in predetermined spaced relation to said plane of the parallel abutment members, said other end support having adjustable means to carry and center the axis of a tapered object supported in said opening in a plane parallel to said base and including means to yieldably urge said object in the direction of the abutment member of said first end support, one of said adjustable abutment members being freely movable and having a comparator gauge mechanism associated therewith responsive to the movement of said member for determining the existence of a variation in the measurement of a tapered object from a predetermined setting of said movable abutment member.

3. A gauge device for checking the measurements of a tapered cylindrical object with reference to a datum line diameter on the taper and comprising a base, upstanding end supports and an intermediate support, each support having means for independently mounting the same in fixed relation directly on said base and said intermediate support having an opening therethrough for passage of a tapered object extending between the end supports, a cylindrical pin at the lower edge of the opening positioned transversely of said base and parallel thereto for supporting the tapered portion of a workpiece, a reciprocable slide member mounted in said intermediate support above said pin for vertical movement in a plane at right angles to the base and carrying an oppositely disposed cylindrical pin parallel to said lower pin for engagement at a diametrically opposite point on the tapered portion of a workpiece, a comparator gauge device on the intermediate support having a movable stem responsive to the vertical movement of said slide member, one of said end supports having a vertically adjustable spring loaded tail stock centering means for engaging in and supporting the end of a workpiece resting on said lower pin and the centering of said piece on an axis parallel to said base, the other end support having a horizontally adjustable back support for a bearing engagement only with the opposite end of a workpiece mounted in the device at a predetermined spaced relation with said vertically aligned pins of said intermediate support.

4. The structure of claim 2 in which said parallel abutment members of the intermediate support are cylindrical pins, and a reciprocable slide member is mounted on said intermediate support and carries said adjustable pin abutment member with means to fix said slide member in the support and determine the spacing between said parallel pins, the adjustable abutment member of said one end support comprising a comparator gauge device with a reciprocable stem and means for adjusting the position of said gauge device in predetermined spaced relation to the said plane of said parallel abutment pin members.

References Cited in the file of this patent
UNITED STATES PATENTS

| | | |
|---|---|---|
| 764,203 | Perkins | July 5, 1904 |
| 1,423,214 | Hill | July 18, 1922 |
| 1,458,306 | Lambert | June 12, 1932 |
| 1,938,216 | Damerell | Dec. 5, 1933 |
| 2,080,941 | Hutchinson | May 18, 1937 |
| 2,490,376 | Rupley | Dec. 6, 1949 |
| 2,497,199 | Aller | Feb. 14, 1950 |
| 2,500,558 | Maxwell | Mar. 14, 1950 |

FOREIGN PATENTS

| | | |
|---|---|---|
| 390,541 | Germany | Feb. 26, 1924 |
| 272,412 | Great Britain | June 16, 1927 |
| 557,578 | Great Britain | Nov. 26, 1943 |